July 15, 1924.
A. A. KLOCKE ET AL
1,501,460
STRAW SPREADER
Filed Dec. 15, 1922
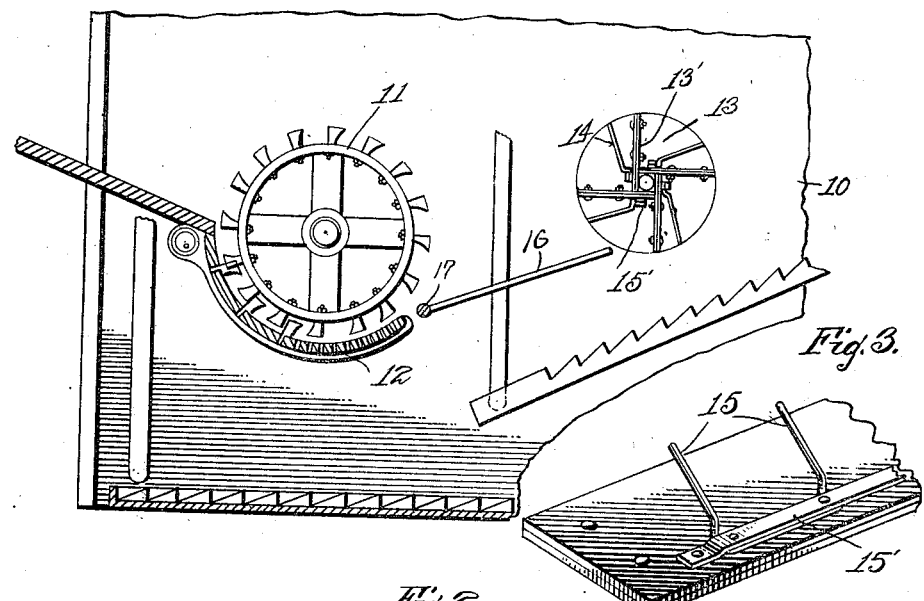
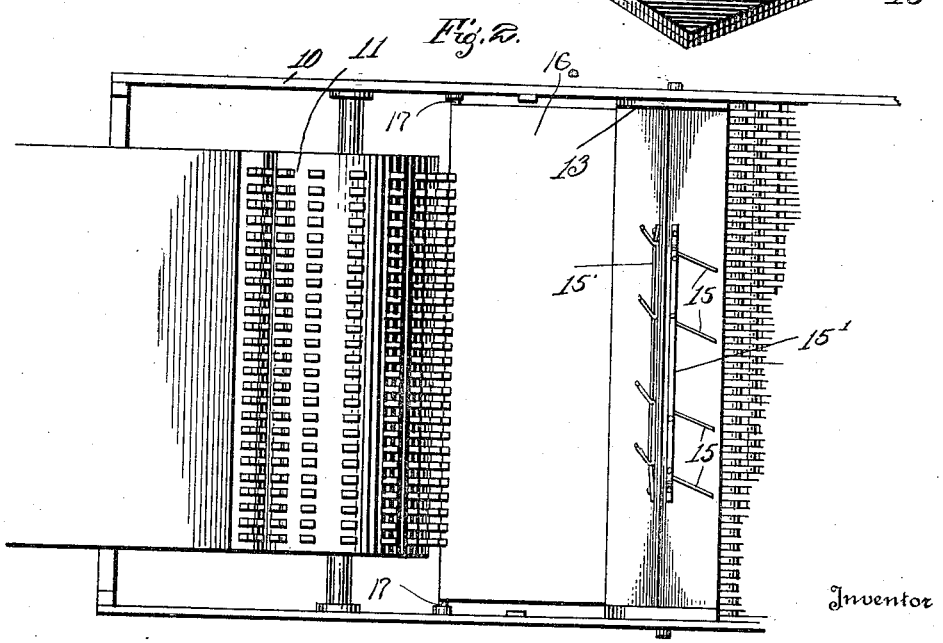
Inventor
Anton A. Klocke
Joseph Wurzer
By
Attorney Patented July 15, 1924.

1,501,460

UNITED STATES PATENT OFFICE.

ANTON A. KLOCKE AND JOSEPH WURZER, OF DEDHAM, IOWA.

STRAW SPREADER.

Application filed December 15, 1922. Serial No. 607,140.

*To all whom it may concern:*

Be it known that we, ANTON A. KLOCKE and JOSEPH WURZER, citizens of the United States, residing at Dedham, in the county of Carroll, State of Iowa, have invented certain new and useful Improvements in Straw Spreaders; and we do hereby declare the following to be a full, clear, and exact description of the invention, such as will enable others skilled in the art to which it appertains, to make and use the same.

This invention relates to new and useful improvements in attachments for thrashing machines, and particularly to devices associated with the feeders therefor.

One object of the invention is to provide a novel and improved device which is adapted to spread the straw to the full width of the thrashing machine, immediately after the straw has passed from the cylinder.

Another object is to provide a spreading device which is attached directly to the beater plate of the thrashing machine, with the resultant greater efficiency of the machine.

Other objects and advantages will be apparent from the following description when taken in connection with the accompanying drawing.

In the drawing:

Figure 1 is a sectional view through a portion of a thrashing machine and feeder, showing the position of the invention.

Figure 2 is a top plan view of the same.

Fig. 3 is a detail view in perspective showing the means for securing the spreader arms to the face of the blade.

Referring particularly to the accompanying drawing, 10 represents a portion of a thrashing machine which has the cylinder 11 and concave 12, to which the material is fed. Inwardly of the cylinder and concave, and arranged in position to permit the straw from the cylinder to pass under it, is the beater 13, including the radially extending plates 13', said plates extending longitudinally of the cylinder and concave, as clearly seen in the plan view Figure 2. Secured to the advance or working face of each of the plates 13' are the yokes 14, each having its arms 15 extended in parallel relation, and obliquely across the plate. The arms of the yokes of each alternate plate extend obliquely in one direction, while the arms of the yokes of the other alternate plates extend obliquely in the opposite direction, so that as the straw is beaten down by the plates 13', it will be engaged by the arms of the yokes 14 and spread in opposite directions, in a horizontal plane, transversely of the machine. Extending longitudinally of each of the plates 13', and secured thereto and resting on the bight portions of the yokes 14, is a retaining bar 15'. The arms of the yokes 14 incline upwardly, away from the face of the plate 13', and in a direction away from their bight portions. Thus the arms serve to move the straw laterally, while at the same time they lift the straw from the plates 13', with the result that the straw is effectively separated and spread to the entire width of the machine.

The plate 16 is provided with the trunnions 17, and extends between the concave and the beater, to convey the straw from the former to the latter.

It will be noted that the arms of the yoke act with some force on the straw, by reason of the rotary movement of the beater, thus thoroughly stirring the straw.

What is claimed is:

1. A straw spreader for a thrashing machine, in combination with a beater having radial blades, of spreader arms carried by and extending obliquely across and away from the faces of said blades.

2. A straw spreader for a thrashing machine, in combination with the rotary beater having radial blades, of a plurality of spreader arms mounted on the beater and extending obliquely and transversely of the blades and diverging from the faces of the blades.

3. In a straw spreader for a thrashing machine, the combination with a beater having radial blades, of a plurality of spreader arms mounted on the beater and arranged in parallel groups, said arms being arranged to extend outward radially of the beater in divergent relation to the faces of the said blades and obliquely across the faces thereof.

4. In a straw spreader for a thrashing machine, the combination with a beater having radial plates, of yokes secured to one face of each plate in transverse parallel and oblique direction with respect to the plate and in upwardly inclined relation thereto, the yokes of each alternate plate extending obliquely in opposite direction to the yokes of the adjacent plates, and retaining members secured to each plate and disposed across the bight portions of the said yokes.

In testimony whereof we affix our signatures, in the presence of two witnesses.

ANTON A. KLOCKE.
JOSEPH WURZER.

Witnesses:
 FRED MCMURRAY,
 GEO. F. DOPHEIDE.